US007798126B2

(12) United States Patent
Kang et al.

(10) Patent No.: US 7,798,126 B2
(45) Date of Patent: Sep. 21, 2010

(54) METHOD FOR CONTROLLING CYLINDER CHARGE IN A HOMOGENEOUS CHARGE COMPRESSION IGNITION ENGINE

(75) Inventors: Jun-Mo Kang, Ann Arbor, MI (US); Chen-Fang Chang, Troy, MI (US); Man-Feng Chang, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 253 days.

(21) Appl. No.: 12/185,873

(22) Filed: Aug. 5, 2008

(65) Prior Publication Data

US 2009/0048762 A1 Feb. 19, 2009

Related U.S. Application Data

(60) Provisional application No. 60/956,423, filed on Aug. 17, 2007.

(51) Int. Cl.
*F02M 7/00* (2006.01)
*F02D 13/04* (2006.01)
(52) U.S. Cl. ........................ 123/435; 123/321
(58) Field of Classification Search ............ 123/406.23, 123/406.41, 406.44, 406.48, 321, 322, 345–348, 123/434, 435
See application file for complete search history.

(56) References Cited

U.S. PATENT DOCUMENTS

| 6,219,611 | B1 * | 4/2001 | Russell ........................ 701/105 |
|---|---|---|---|
| 6,250,283 | B1 * | 6/2001 | Russell et al. ................ 123/361 |
| 6,257,214 | B1 * | 7/2001 | Bidner et al. ........... 123/568.16 |
| 6,470,869 | B1 * | 10/2002 | Russell et al. ................ 123/681 |
| 6,560,527 | B1 * | 5/2003 | Russell et al. ................ 701/110 |
| 6,712,041 | B1 * | 3/2004 | Russell et al. ................ 123/348 |
| 6,978,764 | B1 * | 12/2005 | Russell et al. ................ 123/442 |
| 7,290,527 | B2 * | 11/2007 | Russell et al. ................ 123/348 |
| 7,398,762 | B2 * | 7/2008 | Russell et al. ................ 123/434 |
| 7,444,975 | B2 * | 11/2008 | Kishi et al. ............. 123/184.55 |
| 7,571,707 | B2 * | 8/2009 | Gibson et al. ................ 123/295 |
| 2007/0186892 | A1 * | 8/2007 | Kishi et al. ............. 123/184.55 |
| 2008/0262695 | A1 * | 10/2008 | Gibson et al. ................ 701/102 |

* cited by examiner

*Primary Examiner*—John T Kwon

(57) ABSTRACT

An internal combustion engine includes a controllable throttle control device and controllable engine valves. A method for controlling the engine includes monitoring engine operation and an exhaust gas feedstream, and estimating a cylinder charge temperature based upon the monitored engine operation. Oxygen concentration of the cylinder charge is determined based upon the monitored exhaust gas feedstream, and preferred oxygen concentration of the cylinder charge and preferred cylinder charge temperature are determined. The engine valves are controlled based upon the preferred oxygen concentration of the cylinder charge, the preferred cylinder charge temperature, the oxygen concentration of the cylinder charge, and the estimated cylinder charge temperature.

19 Claims, 4 Drawing Sheets

METHOD FOR CONTROLLING CYLINDER CHARGE IN A HOMOGENEOUS CHARGE COMPRESSION IGNITION ENGINE

CROSS REFERENCE TO RELATED APPLICATIONS

This application claims the benefit of U.S. Provisional Application No. 60/956,423 filed on Aug. 17, 2007 which is hereby incorporated herein by reference.

TECHNICAL FIELD

This disclosure relates to controlling operation of internal combustion engines with controlled auto-ignition combustion.

BACKGROUND

The statements in this section merely provide background information related to the present disclosure and may not constitute prior art.

Known spark-ignition (hereafter 'SI') engines introduce an air/fuel mixture into each cylinder which is compressed in a compression stroke and ignited by a spark plug. Known compression ignition engines inject pressurized fuel into a combustion cylinder near top dead center (hereafter 'TDC') of the compression stroke which ignites upon injection. Combustion for both gasoline engines and diesel engines involves premixed or diffusion flames controlled by fluid mechanics.

SI engines can operate in a variety of different combustion modes, including a homogeneous SI (hereafter 'SI-H') combustion mode or a stratified-charge SI (hereafter 'SI-SC') combustion mode. In a SI-H combustion mode, the cylinder charge is homogeneous in composition, temperature, and residual exhaust gases at timing of spark-ignition. Fuel mass is uniformly distributed around the cylinder chamber at spark timing which occurs near the end of the compression stroke. The air/fuel ratio is preferably stoichiometric. In a SI-SC combustion mode, the air/fuel ratio can be lean of stoichiometry. The fuel mass is stratified in the cylinder chamber with rich layers around the spark plug and leaner air/fuel areas further out. Fuel timing can be close to spark timing to prevent the air/fuel mixture from homogenizing into a uniformly disbursed mixture. The fuel pulse width can end as the spark event begins or substantially prior. Upon ignition, the rich layers burn quick and efficiently. As the combustion process proceeds into the leaner areas, the flame-front cools rapidly resulting in lower NOx emissions.

SI engines can be adapted to operate in a homogeneous-charge compression-ignition (hereafter 'HCCI') combustion mode, also referred to as controlled auto-ignition combustion, under predetermined speed/load operating conditions. The controlled auto-ignition combustion comprises a distributed, flameless, auto-ignition combustion process that is controlled by oxidation chemistry. An engine operating in the HCCI combustion mode has a cylinder charge that is preferably homogeneous in composition, temperature, and residual exhaust gases at intake valve closing time. Controlled auto-ignition combustion is a distributed kinetically-controlled combustion process with the engine operating at a dilute air/fuel mixture, i.e., lean of an air/fuel stoichiometric point, with relatively low peak combustion temperatures, resulting in low NOx emissions. The homogeneous air/fuel mixture minimizes occurrences of rich zones that form smoke and particulate emissions.

In an engine configured for multiple combustion modes, switching between the different combustion modes can be advantageous. Different combustion modes in similar speed/load situations can have performance differences in engine stability, emissions, and fuel economy. Transitioning to a particular mode with the best performance in a particular situation is therefore preferable. Selecting a combustion mode in which to operate can be based upon which combustion mode performs better at a particular engine load and speed. When a change in speed and/or engine load warrants the switch to a different combustion mode, a transition strategy will be performed and the engine will transition to the different combustion mode.

As the number of combustion modes increases, transitioning between combustion modes and coordinating transitions can be complex. The engine control module must be capable of operating the engine in multiple combustion modes and switching among them seamlessly. Without a switching strategy, a significant transient response may occur resulting in incomplete combustion and misfires, leading to torque disturbances and/or undesirable emissions.

SUMMARY

An internal combustion engine includes a controllable throttle control device and controllable engine valves. A method for controlling the engine includes monitoring engine operation and an exhaust gas feedstream, and estimating a cylinder charge temperature based upon the monitored engine operation. Oxygen concentration of the cylinder charge is determined based upon the monitored exhaust gas feedstream, and preferred oxygen concentration of the cylinder charge and preferred cylinder charge temperature are determined. The engine valves are controlled based upon the preferred oxygen concentration of the cylinder charge, the preferred cylinder charge temperature, the oxygen concentration of the cylinder charge, and the estimated cylinder charge temperature.

BRIEF DESCRIPTION OF THE DRAWINGS

One or more embodiments will now be described, by way of example, with reference to the accompanying drawings, in which.

DETAILED DESCRIPTION

Figure 1:
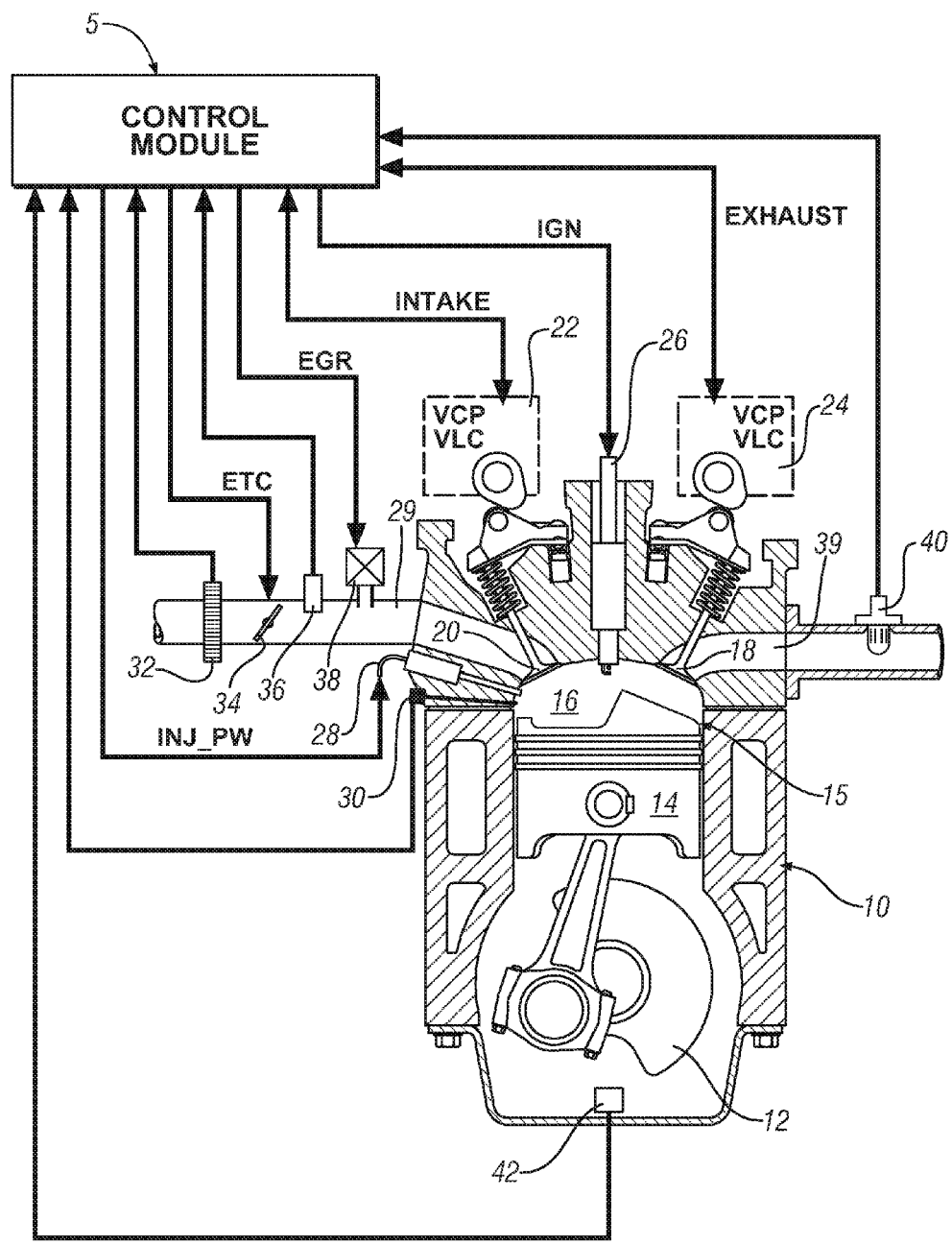
FIG. 1 is a schematic drawing of an engine system in accordance with the present disclosure.

Referring now to the drawings, wherein the depictions are for the purpose of illustrating certain exemplary embodiments only and not for the purpose of limiting the same, FIG. 1 schematically shows an internal combustion engine 10, an accompanying control module 5, and an exhaust aftertreatment system 70 that have been constructed in accordance with an embodiment of the disclosure. The engine 10 may be selectively operative in a plurality of combustion modes, including a controlled auto-ignition combustion mode, a homogeneous spark-ignition combustion mode, and a stratified-charge spark-ignition combustion mode. The engine 10 is selectively operative at a stoichiometric air/fuel ratio and at an air/fuel ratio that is primarily lean of stoichiometry. The disclosure can be applied to various internal combustion engine systems and combustion cycles.

The exemplary engine 10 comprises a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which their linear reciprocating motion is translated to rotational motion. An air intake system provides intake air to an intake manifold 29 which directs and distributes air into an intake runner to each combustion chamber 16. The air intake system comprises air flow ductwork and devices for monitoring and controlling the air flow. The air intake devices preferably include a mass air flow sensor 32 for monitoring mass air flow and intake air temperature. A throttle valve 34 preferably comprises an electronically controlled device which controls air flow to the engine 10 in response to a control signal ('ETC') from the control module 5. A pressure sensor 36 in the manifold is adapted to monitor manifold absolute pressure and barometric pressure. An external flow passage recirculates exhaust gases from engine exhaust to the intake manifold, having a flow control valve, referred to as an exhaust gas recirculation ('EGR') valve 38. The control module 5 is operative to control mass flow of exhaust gas to the intake manifold 29 by controlling opening of the EGR valve 38.

Air flow from the intake manifold 29 into each of the combustion chambers 16 is controlled by one or more intake valves 20. Flow of combusted gases from each of the combustion chambers 16 to an exhaust manifold 39 is controlled by one or more exhaust valves 18. Openings and closings of the intake and exhaust valves 20 and 18 are preferably controlled with a dual camshaft (as depicted), the rotations of which are linked and indexed with rotation of the crankshaft 12. The engine 10 is equipped with devices for controlling valve lift of the intake valves and the exhaust valves, referred to as variable lift control (hereafter 'VLC') devices. The variable lift control devices are operative to control valve lift, or opening, to one of two distinct steps, e.g., a low-lift valve opening (about 4-6 mm) for low speed, low load engine operation, and a high-lift valve opening (about 8-10 mm) for high speed, high load engine operation. The engine is further equipped with devices for controlling phasing (i.e., relative timing) of opening and closing of the intake and exhaust valves 20 and 18, referred to as variable cam phasing (hereafter 'VCP'), to control phasing beyond that which is effected by the two-step VLC lift. There is a VCP/VLC system 22 for the intake valves 20 and a VCP/VLC system 24 for the engine exhaust valves 18. The VCP/VLC systems 22 and 24 are controlled by the control module 5, and provide signal feedback to the control module 5 for example through camshaft rotation position sensors for the intake camshaft (not shown) and the exhaust camshaft (not shown).

The intake and exhaust VCP/VLC systems 22 and 24 have limited ranges of authority over which opening and closing of the intake and exhaust valves 18 and 20 can be controlled. VCP systems can have a range of phasing authority of about 60°-90° of camshaft rotation, thus permitting the control module 5 to advance or retard opening and closing of one of the intake and exhaust valves 20 and 18. The range of phasing authority is defined and limited by the hardware of the VCP and the control system which actuates the VCP. The intake and exhaust VCP/VLC systems 22 and 24 may be actuated using one of electro-hydraulic, hydraulic, and electric control force, controlled by the control module 5.

The engine 10 includes a fuel injection system, comprising a plurality of high-pressure fuel injectors 28 each adapted to directly inject a mass of fuel into one of the combustion chambers 16, in response to a signal from the control module 5. The fuel injectors 28 are supplied pressurized fuel from a fuel distribution system (not shown).

The engine 10 includes a spark-ignition system by which spark energy is provided to a spark plug 26 for igniting or assisting in igniting cylinder charges in each of the combustion chambers 16 in response to a signal ('IGN') from the control module 5.

The engine 10 is equipped with various sensing devices for monitoring engine operation, including monitoring crankshaft rotational position, i.e., crank angle and speed. Sensing devices include a crankshaft rotational speed sensor ('crank sensor') 42, a combustion sensor 30 adapted to monitor combustion and an exhaust gas sensor 40 adapted to monitor exhaust gases, preferably a wide range air/fuel ratio sensor in this embodiment. The combustion sensor 30 comprises a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure (hereafter 'IMEP') for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

The control module 5 executes algorithmic code stored therein to control the aforementioned actuators to control engine operation, including throttle position, spark timing, fuel injection mass and timing, intake and/or exhaust valve timing and phasing, and EGR valve position to control flow of recirculated exhaust gases. Valve timing and phasing includes NVO and lift of exhaust valve reopening in an exhaust re-breathing strategy. The control module 5 is adapted to receive input signals from an operator, e.g., a throttle pedal position and a brake pedal position to determine an operator torque request and signals from the sensors indicating the engine speed and intake air temperature, and coolant temperature and other ambient conditions.

The control module 5 is preferably a general-purpose digital computer generally comprising a microprocessor or central processing unit, storage mediums comprising non-volatile memory including read only memory and electrically programmable read only memory, random access memory, a high speed clock, analog to digital and digital to analog circuitry, and input/output circuitry and devices and appropriate signal conditioning and buffer circuitry. The control module has a set of control algorithms, comprising resident program instructions and calibrations stored in the non-volatile memory. The algorithms are preferably executed during preset loop cycles. Algorithms are executed by the central processing unit and are operable to monitor inputs from the aforementioned sensing devices and execute control and diagnostic routines to control operation of the actuators, using preset calibrations. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 executes algorithmic code stored therein to control the aforementioned actuators to form the cylinder charge, including controlling throttle position, spark-ignition timing, fuel injection mass and timing, EGR valve position to control flow of recirculated exhaust gases, and intake and/or exhaust valve timing and phasing on engines so equipped. The control module 5 can operate to turn the engine 10 on and off during ongoing vehicle operation, and can operate to selectively deactivate a portion of the combustion chambers 16 or a portion of the valves through control of fuel and spark and valve deactivation.

Figure 2:
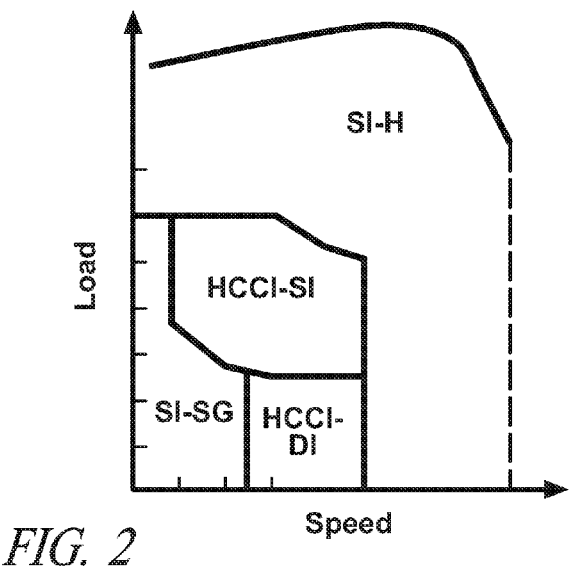
FIG. 2 is a data graph in accordance with the present disclosure.

FIG. 2 schematically depicts preferred operating ranges for the exemplary engine 10 in spark ignition and controlled auto-ignition combustion modes, based upon states of engine parameters, in this embodiment comprising speed ('RPM') and load ('LOAD') which is derivable from engine parameters including the fuel flow and the intake manifold pressure. The engine combustion modes preferably comprise a spray-guided spark ignition ('SI-SG') combustion mode, a single injection controlled auto-ignition ('HCCI-SI') combustion mode, and double injection controlled auto-ignition ('HCCI-DI') combustion mode, and a homogeneous spark ignition ('SI-H') combustion mode. A preferred speed and load operating range for each combustion mode can be determined based upon engine operating parameters, including combustion stability, fuel consumption, emissions, engine torque output, and others. Boundaries that define the preferred speed and load operating ranges to delineate operation in the aforementioned combustion modes are preferably precalibrated and stored in the control module 5.

The engine 10 is controlled to operate at a preferred air-fuel ratio and the intake air flow is controlled to achieve the preferred air-fuel ratio. This includes estimating a cylinder charge based upon engine operation in the selected combustion mode. The throttle valve 34 and VCP/VLC devices 22 and 24 can be controlled to achieve an intake air flowrate based upon the estimated cylinder charge, including during a transition between the spark ignition and controlled auto-ignition combustion modes. Air flow is controlled by adjusting the throttle valve 34 controlling VCP/VLC devices 22 and 24 to control the opening timing and profiles of the intake and exhaust valve(s) 20 and 18. Operation in the two combustion modes requires different settings for the VCP/VLC devices 22 and 24 in terms of valve timing, phasing, and lift profiles of the intake and exhaust valve(s) 20 and 18 and opening of the throttle valve 34. By way of example, the throttle valve 34 is preferably controlled to a wide-open position in the auto-ignited combustion mode with the engine 10 controlled at a lean air-fuel ratio, whereas the throttle valve 34 is preferably controlled to regulate the air flow and the engine 10 is controlled to a stoichiometric air-fuel ratio in the spark-ignited combustion mode.

In the exemplary engine 10, oxygen concentration and temperature of each cylinder charge can be controlled by varying the amount of internal EGR by controlling opening and closing of the intake and exhaust valves 20 and 18 using the VCP/VLC devices 22 and 24. Once the valve motion is fixed the partial pressures of the intake air charge and the exhaust gas remaining in the cylinder 15 remain constant.

In the exhaust recompression strategy, the exhaust valve 18 is closed before TDC and the intake valve 20 opens after TDC creating a negative valve overlap period (EVC-IVO) in which both the exhaust and intake valves are closed, thereby trapping the exhaust gas. In one embodiment, the exhaust valve 18 opens at approximately 10 to 15 degrees before bottom dead center in the expansion stroke, and closes during the exhaust stroke in a range of 90 to 45 degrees before top dead center. Preferably, the intake valve 20 is opened in the range of 45 to 90 degrees after top dead center during the intake stroke and closed approximately 30 degrees after bottom dead center in the compression stroke.

In the exhaust re-breathing strategy, the exhaust valve 18 is opened for two separate periods during the four-stroke engine cycle. The exhaust valve 18 is opened for a first period during the exhaust stroke to allow combusted gases to be expelled from the combustion chamber 16. The exhaust valve 18 is reopened for a second period during the intake stroke to allow combusted gases previously exhausted from the combustion chamber 16 to be drawn back into the combustion chamber 16.

An engine equipped for the exhaust recompression or the exhaust re-breathing strategy preferably includes electrically controlled hydraulic or electromechanical actuation i.e., fully flexible valve actuation. Alternatively, multi-profile cams (i.e., multi-lobe, multi-step) and selection mechanisms, cam phasers and other mechanically variable valve actuation technologies can be implemented individually or in combination.

Figure 3:
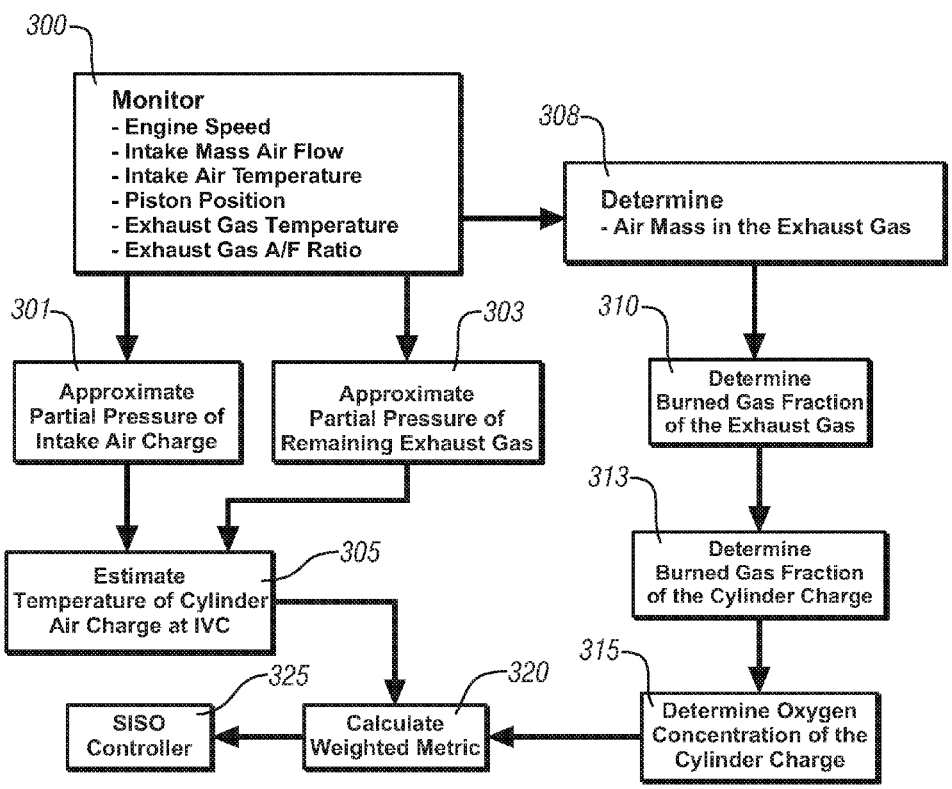
FIG. 3 is a schematic block diagram of a control scheme in accordance with the present disclosure.

FIG. 3 shows a schematic block diagram of a control scheme for operating the exemplary engine 10 described with reference to FIG. 1, using a selected valve strategy, i.e., either the exhaust recompression strategy or the exhaust re-breathing strategy. Operating states of the engine 10 and exhaust system are monitored, including engine speed, intake mass air flow, intake air temperature, and temperature of the exhaust gas feedstream, and cylinder volume at intake valve closing can be determined (300). The cylinder volume at intake valve closing is determined based upon piston position measured from the crank sensor 42.

A temperature at intake valve closing ('$T_{IVC}$') is determined for the combustion cycle (305). The temperature at intake valve closing $T_{IVC}$ is preferably determined based upon partial pressures of the intake air charge $p_{ip}$ (301) and the exhaust gas $p_{ep}$ remaining in the combustion chamber (303). When the engine 10 is running unthrottled, the intake mass air flow measured by the mass air flow sensor 32 is approximately equal to the mass air flow from the intake manifold 29 to the cylinder 15 through the intake valve. Thus, the partial pressures of the intake air charge $p_{ip}$ and the remaining exhaust gas $p_{ep}$ in the combustion chamber 16 can be approximated as:

$$p_{ip} \approx MAF \frac{30}{RPM} \frac{RT_{int}}{V} \quad [1]$$

$$p_{ep} \approx p_i - p_{ip}$$

wherein MAF is measured intake mass air flow, R is the gas constant, V is the cylinder volume at intake valve closing, RPM is the engine speed, $p_i$ is the intake manifold pressure and $T_{int}$ is the intake air temperature.

Once the partial pressures of the intake air charge and the remaining exhaust gas are determined, the temperature of the cylinder charge at intake valve closing $T_{IVC}$ for the next combustion cycle can be estimated (305). The temperature of the cylinder charge at intake valve closing $T_{IVC}$ for the next combustion cycle can be determined based upon the partial pressures of the intake air charge $p_{ip}$ and the remaining exhaust gas $p_{ep}$, and the exhaust gas temperature $T_{exh}$. The exhaust gas temperature $T_{exh}$ is determined based upon monitored temperature from the exhaust gas sensor 40. The temperature of the cylinder charge at intake valve closing $T_{IVC}$ is preferably given by:

$$T_{IVC} = \frac{m_{int}T_{int} + m_{exh}T_{exh}}{m_{int} + m_{exh}} = \frac{p_i T_{int} T_{exh}}{p_{ip}T_{exh} + p_{ep}T_{int}} \quad [2]$$

$$p_i = p_{ip} + p_{ep}$$

wherein $m_{int}$ is the mass of the intake air charge in the combustion chamber 16, $m_{exh}$ is the mass of the exhaust gas remaining in the combustion chamber 16, $T_{int}$ is the intake temperature, $p_i$ is the intake manifold pressure, $p_{ip}$ is the partial pressure of the intake air charge, and $p_{ep}$ is the partial pressure of the exhaust gas remaining in the combustion chamber 16. Both the partial pressure of the exhaust gas $p_{ep}$ and the partial pressure of the intake air charge $p_{ip}$ remain constant as long as valve motion of the intake and exhaust valves 20 and 18 is fixed.

The control strategy further comprises determining air mass, burned or unburned, in the exhaust manifold 39 (308). The air mass in the exhaust manifold 39 can be determined based upon an exhaust gas air/fuel ratio of the exhaust gas feedstream. The exhaust gas air/fuel ratio can be measured using the exhaust gas sensor 40 (300). The total air mass including burned or unburned air in the exhaust gas feedstream can be expressed as follows, assuming that fuel injected in combustion chambers 16 completely burns:

$$m_a = \lambda m_f \quad [3]$$

wherein $\lambda$ is the air-fuel ratio of the exhaust gas feedstream, $m_a$ is the total mass of the burned and unburned air in the exhaust manifold 39, and $m_f$ is the burned fuel mass in the exhaust manifold 39.

Once the air mass is determined, a burned gas fraction of exhaust gas $f_{exh}$ that exits the exhaust valve and into the exhaust gas feedstream can be determined (310). The burned gas fraction of the exhaust gas $f_{exh}$ can be calculated based upon a monitored exhaust gas air/fuel ratio of the exhaust gas feedstream, a total mass of burned and unburned air in the exhaust manifold 39.

Since the total exhaust mass is the sum of burned fuel and air, burned or unburned, the burned gas fraction $f_{exh}$ in the exhaust manifold can be determined using the following equation:

$$f_{exh} = \frac{(1+\lambda_s)m_f}{m_f + m_a} = \frac{(1+\lambda_s)m_f}{m_f + \lambda m_f} = \frac{1+\lambda_s}{1+\lambda} \quad [4]$$

wherein $\lambda_s$ is the stoichiometric air-fuel ratio.

Once the burned gas fraction of the exhaust gas $f_{exh}$ is determined, a burned gas fraction of the cylinder charge $f_{cyl}$ can be determined (313). The burned gas fraction of the cylinder charge $f_{cyl}$ is defined as the ratio between the burned fuel mass (through previous combustion process) and the total mass of cylinder charge. It is assumed that there is no external EGR, i.e., the intake air charge through the intake valve consists of only fresh air. The burned gas fraction of the cylinder charge $f_{cyl}$ is preferably calculated using the following equation:

$$f_{cyl} = \frac{m_{iEGR}}{m_{cyl}} f_{exh} = \frac{p_{ep}}{p_i} f_{exh} \quad [5]$$

wherein $f_{cyl}$ is the burned gas fraction of cylinder charge, $f_{exh}$ is the burned gas fraction of the exhaust gas that exits the exhaust valve 18, $m_{iEGR}$ is the mass of exhaust gas remaining in the combustion chamber 16, and $m_{cyl}$ is the mass of cylinder charge.

Once the burned gas fraction of the cylinder charge $f_{cyl}$ is determined, oxygen concentration of the cylinder charge is determined (315). The oxygen concentration of the cylinder charge can be approximated based upon the burned gas fraction of the cylinder charge $f_{cyl}$. Eqs. (1), (4) and (5) are combined, indicating that the burned gas fraction of cylinder charge $f_{cyl}$ and the burned gas fraction of the exhaust gas $f_{exh}$ can be calculated using several measurable variables. The oxygen concentration of the cylinder charge can be calculated based on constituents of the dry air (mole of $O_2$: mole of $N_2$=1:3.8) and is preferably calculated using the following equation:

$$O_2(\% \text{ volume}) = (1 - f_{cyl}) \times \frac{1}{1+3.8} \times 100 \quad [6]$$

Once the temperature at intake valve closing $T_{IVC}$ and the oxygen concentration of the cylinder charge are determined, a weighted metric of the temperature at intake valve closing $T_{IVC}$ and the oxygen concentration is determined (320). The oxygen concentration and temperature of the cylinder charge can not independently controlled by controlling timing, phasing, and lift of the intake and exhaust valves 20 and 18. Hence, the weighted metric is used as a control variable to independently control VLC/VCP devices 22 and 24 to control the opening and closing of the intake and exhaust valves 20 and 18. The weighted metric is given by:

$$y = w_1(O_2 - O_2^d) + w_2(\hat{T}_{IVC} - T_{IVC}^d), \ w_1, w_2 \in \mathfrak{R} \quad [7]$$

wherein $O_2^d$ is a desired oxygen concentration of the cylinder charge, $T_{IVC}^d$ is a desired temperature of the cylinder charge, $\hat{T}_{IVC}$ is the estimated charge temperature from Eq. (2), and $w_1$ and $w_2$ are preferably predetermined weighted coefficients determined for the specific application.

A single-input single-output (SISO) controller can be used to control opening and closing the engine valves, including in this embodiment controlling timing, phasing and lift of the engine valves using the VCP/VLC systems 22 and 24 based upon the determined weighted metric (325). The SISO controller outputs the engine valve positions and the control module 5 controls the engine valves.

Figure 4A:
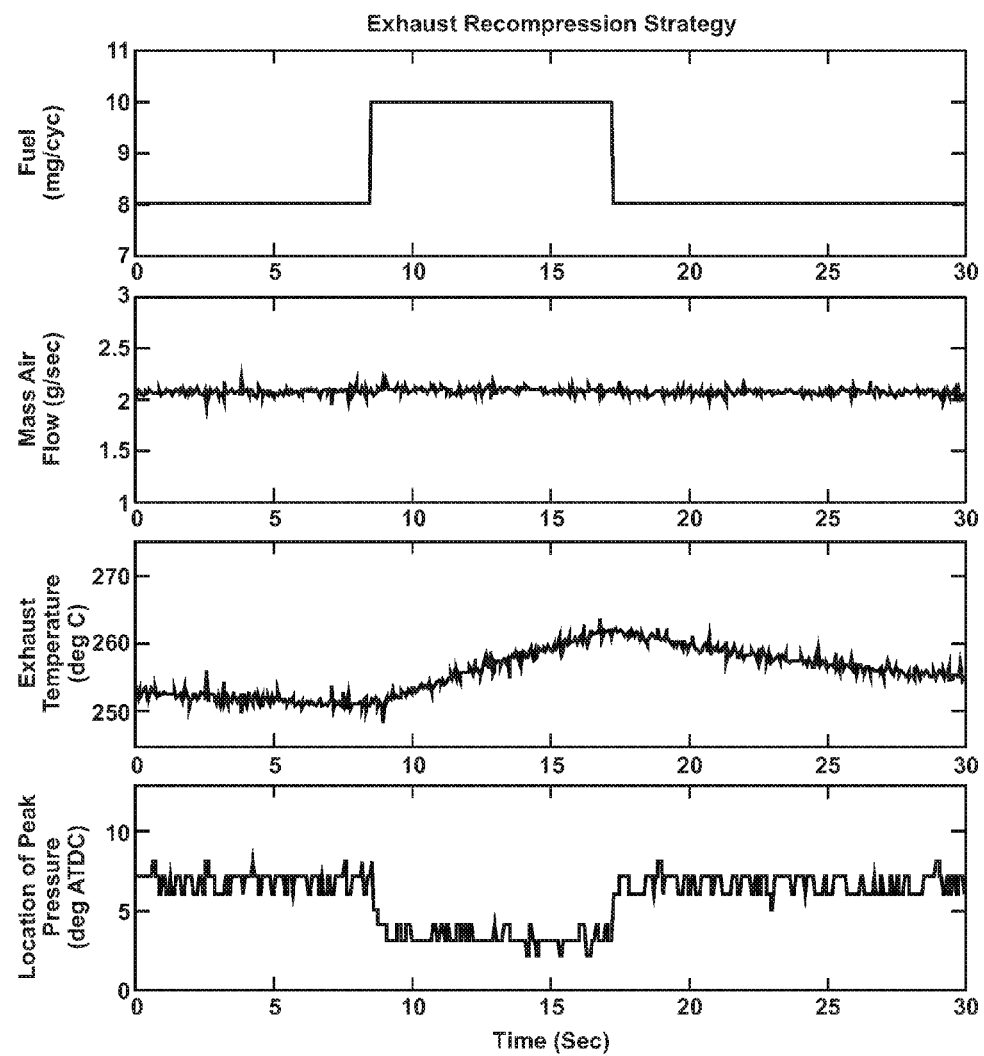
FIGS. 4A and 4B are data graphs in accordance with the present disclosure.
Figure 4B:
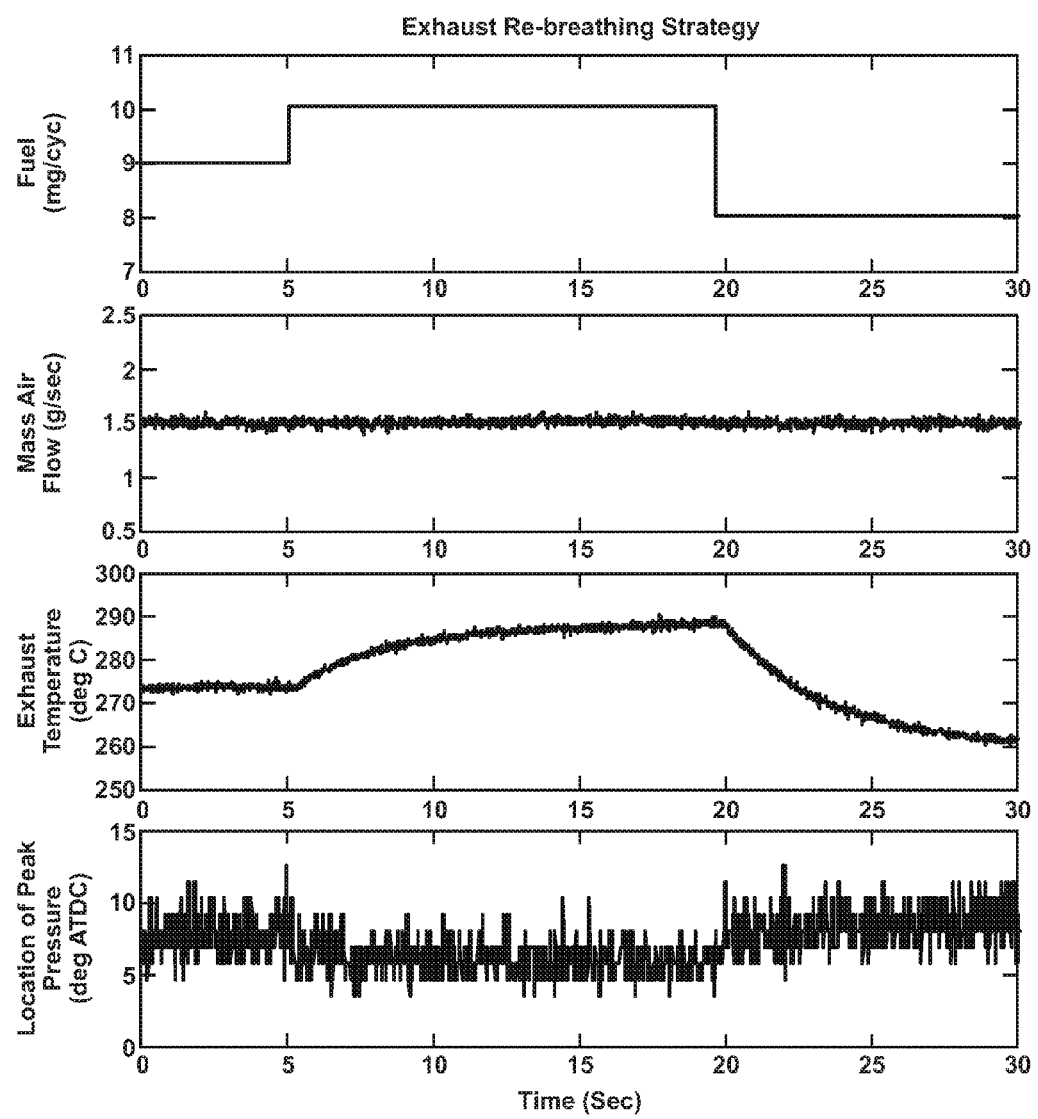

FIG. 4A depicts experimental data taken from a single-cylinder HCCI engine operating with the exhaust recompression strategy that illustrates engine operation utilizing the system described herein. FIG. 4B depicts experimental data taken from a single-cylinder HCCI engine operating with the exhaust re-breathing strategy that illustrates engine operation. The experimental data was obtained from the HCCI engine operating under unthrottled conditions with exhaust recompression and re-breathing strategies at 1000 rpm, with no external EGR, with fixed openings and closings of the intake and exhaust valves, and with constant intake air temperature. The fueling rate ('Fuel') was increased and subsequently decreased, resulting in increasing and subsequently decreasing the exhaust gas temperature ('Exhaust Temperature'). The exhaust gas temperature was measured using a thermocouple located at the exhaust port.

The results in FIGS. 4A and 4B demonstrate that the measured intake mass air flow ('Mass Air Flow') is maintained at a constant value with changes in the exhaust gas temperature as fueling rate changes, thus affecting combustion timing as indicated by location of peak cylinder pressure ('Location of Peak Pressure'). Since the intake temperature was maintained constant during the experiment, the partial pressure of the intake air charge remains constant even though the exhaust gas temperature changes. This indicates that the partial pressure of the exhaust gas remaining in the combustion chamber 16 remains constant. Furthermore, the sum of these two partial pressures is the total cylinder charge pressure and is approximately equal to the pressure at intake valve closing, which is roughly the ambient pressure under unthrottled operating conditions.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling an internal combustion engine including a controllable throttle control device and controllable engine valves, the method comprising:
monitoring engine operation and an exhaust gas feedstream;
estimating a cylinder charge temperature based upon the monitored engine operation;
determining an oxygen concentration of the cylinder charge based upon the monitored exhaust gas feedstream;
determining a preferred oxygen concentration of the cylinder charge and a preferred cylinder charge temperature; and
controlling the engine valves based upon the preferred oxygen concentration of the cylinder charge, the preferred cylinder charge temperature, the oxygen concentration of the cylinder charge, and the estimated cylinder charge temperature.

2. The method of claim 1, further comprising:
monitoring an air/fuel ratio of the exhaust gas feedstream;
determining a total air mass in the exhaust gas feedstream based upon the air/fuel ratio of the exhaust gas feedstream.

3. The method of claim 2, further comprising:
determining a burned gas fraction of the exhaust gas feedstream based upon the air/fuel ratio of the exhaust gas feedstream and the total air mass in the exhaust gas feedstream.

4. The method of claim 3, further comprising:
determining mass of the exhaust gas remaining in a combustion chamber; and
determining the burned gas fraction of the cylinder charge for the combustion chamber based upon the burned gas fraction of the exhaust gas feedstream, and the mass of the exhaust gas remaining in the combustion chamber.

5. The method of claim 4, further comprising:
determining the oxygen concentration of the cylinder charge based upon the burned gas fraction of the cylinder charge.

6. The method of claim 1, further comprising:
determining a weighted metric based upon the preferred oxygen concentration of the cylinder charge, the preferred cylinder charge temperature, the estimated cylinder charge temperature, and the oxygen concentration of the cylinder charge; and
controlling opening and closing of the engine valves based upon the weighted metric.

7. The method of claim 1, further comprising:
monitoring intake mass air flow, intake air temperature, engine speed, and piston position;
determining cylinder volume at intake valve closing based upon the monitored piston position; and
approximating a partial pressure of the intake air charge based upon the intake mass air flow, the intake air temperature, the engine speed, and the cylinder volume at intake valve closing.

8. The method of claim 7, further comprising:
monitoring intake manifold pressure; and
approximating a partial pressure of the exhaust gas remaining in a combustion chamber based upon the partial pressure of the intake air charge and the intake manifold pressure.

9. The method of claim 8, further comprising:
monitoring intake air mass and mass of the exhaust gas remaining in a combustion chamber after combustion;
determining an exhaust gas temperature; and
estimating the cylinder charge temperature based upon the partial pressure of the intake air charge, the partial pressure of the exhaust gas remaining in the combustion chamber, the exhaust gas temperature, the intake air temperature, the intake air mass, and the mass of the exhaust gas remaining in the combustion chamber after combustion.

10. The method of claim 1, further comprising:
controlling opening and closing of the engine valves based upon a difference between the estimated and preferred oxygen concentrations of the cylinder charge and a difference between the estimated and the preferred cylinder charge temperatures.

11. A method for controlling engine valves of an internal combustion engine, comprising:
monitoring engine operation and an exhaust gas feedstream;
approximating a partial pressure of an intake air charge based upon an intake mass air flow, an intake air temperature, engine speed, and cylinder volume at intake valve closing;
approximating a partial pressure of exhaust gas remaining in a combustion chamber based upon the partial pressure of the intake air charge and intake manifold pressure;
estimating a cylinder charge temperature based upon the partial pressure of the intake air charge and the partial pressure of the exhaust gas remaining in the combustion chamber
determining an oxygen concentration of the cylinder charge based upon the monitored exhaust gas feedstream; and controlling opening and closing of the engine valves based upon the oxygen concentration of the cylinder charge and the estimated cylinder charge temperature.

12. The method of claim 11, further comprising:

determining a preferred oxygen concentration of the cylinder charge and a preferred cylinder charge temperature; and controlling the engine valves based upon the preferred oxygen concentration of the cylinder charge, the preferred cylinder charge temperature, the oxygen concentration of the cylinder charge, and the estimated cylinder charge temperature.

13. The method of claim 11, further comprising:

monitoring an air/fuel ratio of the exhaust gas feedstream;

determining a total air mass in the exhaust gas feedstream based upon the air/fuel ratio of the exhaust gas feedstream

14. The method of claim 13, further comprising:

determining a burned gas fraction of the exhaust gas feedstream based upon the air/fuel ratio of the exhaust gas feedstream and the total air mass in the exhaust gas feedstream.

15. The method of claim 14, further comprising:

determining mass of the exhaust gas remaining in a combustion chamber; and determining a burned gas fraction of the cylinder charge for the combustion chamber based upon the burned gas fraction of the exhaust gas feedstream, and the mass of the exhaust gas remaining in the combustion chamber.

16. The method of claim 15, further comprising:

determining the oxygen concentration of the cylinder charge based upon the burned gas fraction of the cylinder charge.

17. The method of claim 11, further comprising:

determining a weighted metric based upon the preferred oxygen concentration of the cylinder charge, the preferred cylinder charge temperature, the estimated cylinder charge temperature, and the oxygen concentration of the cylinder charge; and controlling opening and closing of the engine valves based upon the weighted metric.

18. The method of claim 11, further comprising:

monitoring intake air mass and mass of the exhaust gas remaining in a combustion chamber after combustion;

determining an exhaust gas temperature; and estimating the cylinder charge temperature based upon the partial pressure of the intake air charge, the partial pressure of the exhaust gas remaining in the combustion chamber, the exhaust gas temperature, the intake air temperature, the intake air mass, and the mass of the exhaust gas remaining in the combustion chamber after combustion.

19. The method of claim 11, further comprising:

controlling opening and closing of the engine valves based upon a difference between the estimated and preferred oxygen concentrations of the cylinder charge and a difference between the estimated and the preferred cylinder charge temperatures.

* * * * *